United States Patent
Hamasuna

[11] Patent Number: 6,032,864
[45] Date of Patent: Mar. 7, 2000

[54] IMAGE READER

[75] Inventor: Shunsuke Hamasuna, Ebina, Japan

[73] Assignee: Fuji Xerox, Co., Ltd., Tokyo, Japan

[21] Appl. No.: 09/016,231

[22] Filed: Jan. 30, 1998

[30] Foreign Application Priority Data

Feb. 4, 1997 [JP] Japan ................................ 9-021751

[51] Int. Cl.[7] ........................... G06K 07/10; H04N 01/04
[52] U.S. Cl. ................... 235/462.25; 358/448; 358/496; 358/497
[58] Field of Search .................... 235/472.01, 472.02, 235/462.01, 462.1, 462.2, 462.21, 462.25, 462.26, 462.27, 462.36

[56] References Cited

U.S. PATENT DOCUMENTS

| | | | |
|---|---|---|---|
| 4,771,473 | 9/1988 | Sugiura | 358/451 |
| 5,040,041 | 8/1991 | Yamada et al. | 357/30 |
| 5,097,519 | 3/1992 | Sugiura | 382/298 |
| 5,101,283 | 3/1992 | Seki et al. | 358/456 |
| 5,113,248 | 5/1992 | Hibi et al. | 358/501 |
| 5,113,251 | 5/1992 | Ichiyanagi et al. | 358/500 |
| 5,121,195 | 6/1992 | Seki et al. | 358/515 |
| 5,132,786 | 7/1992 | Ishiwata | 358/500 |
| 5,168,369 | 12/1992 | Sugiura | 358/296 |
| 5,189,528 | 2/1993 | Takashima | 358/448 |
| 5,189,529 | 2/1993 | Ishiwata et al. | 358/451 |
| 5,195,148 | 3/1993 | Sugiura | 382/298 |
| 5,198,909 | 3/1993 | Ogiwara et al. | 358/412 |
| 5,204,755 | 4/1993 | Taga et al. | 358/400 |
| 5,345,518 | 9/1994 | Murakami | 382/232 |
| 5,406,062 | 4/1995 | Hasegawa et al. | 235/462 |
| 5,469,506 | 11/1995 | Berson et al. | 235/379 |
| 5,602,379 | 2/1997 | Uchimura et al. | 235/472 |
| 5,668,637 | 9/1997 | Yamaguchi | 358/396 |
| 5,754,670 | 5/1998 | Shin et al. | 382/56 |

FOREIGN PATENT DOCUMENTS 4-369163  12/1992  Japan.
B2-736616  4/1995  Japan.

*Primary Examiner*—Thien M. Le
*Attorney, Agent, or Firm*—Oliff & Berridge, PLC

[57] ABSTRACT

Vertical scanning speed and the accumulation time of photoelectric conversion elements arranged in a CCD are set in accordance with a resolution and a magnification set on a control panel. The accumulation time is set in a timing control section and the CCD is driven. The vertical scanning speed is set in a scan motor or is sent to an ADF control section for controlling a move of an original or an optical system, whereby the original is vertically scanned in response to the setup resolution and magnification for sampling the original image. As the accumulation time is changed, CCD output changes. Thus, to correct it, a gain and offset values as the accumulation time is changed are set in gain control sections, an odd/even correction section, and an offset correction section.

4 Claims, 9 Drawing Sheets

FIG. 3

| MODE | RESOLUTION (SPI) | SETUP MAGNIFICATION (%) | VERTICAL SCANNING SPEED | ACCUMULATION TIME (μsec) | INTERPOLATION |
|---|---|---|---|---|---|
| 1 | 600 | 25 - 400 | SETUP MAGNIFICATION | 244.70 | NONE |
| 2 | 400 | 50 - 400 | SETUP MAGNIFICATION | 367.05 | NONE |
| 3 | 200 | 50 - 400 | SETUP MAGNIFICATION x 2 | 367.05 | NONE |
| 4 | 100 | 100 - 400 | SETUP MAGNIFICATION x 4 | 367.05 | NONE |
| 5 | 100 | 50 - 99 | SETUP MAGNIFICATION x 2 | 734.10 | NONE |
| 6 | 400 | 50 - 400 | SETUP MAGNIFICATION | 367.05 | NONE |
| 7 | 200 | 100 - 400 | SETUP MAGNIFICATION x 2 | 367.05 | NONE |
| 8 | 200 | 50 - 99 | SETUP MAGNIFICATION | 734.10 | NONE |
| 9 | 100 | 200 - 400 | SETUP MAGNIFICATION x 4 | 367.05 | NONE |
| 10 | 100 | 100 - 199 | SETUP MAGNIFICATION x 2 | 734.10 | NONE |
| 11 | 100 | 50 - 99 | SETUP MAGNIFICATION | 1468.20 | NONE |
| 12 | 600 | 50 - 141 | SETUP MAGNIFICATION ÷ 3 | 734.10 | NONE |
| 13 | 400 | 50 - 400 | SETUP MAGNIFICATION | 367.05 | NONE |
| 14 | 300 | 50 - 400 | SETUP MAGNIFICATION | 489.40 | NONE |

FIG. 9

| MODE | RESOLUTION (SPI) | SETUP MAGNIFICATION (%) | VERTICAL SCANNING SPEED | ACCUMULATION TIME (μsec) | INTERPOLATION |
|---|---|---|---|---|---|
| 2 | 400 | 50 - 400 | SETUP MAGNIFICATION | 466.9 | NONE |
| 3 | 200 | 50 - 400 | SETUP MAGNIFICATION x 2 | ↑ | NONE |
| 4 | 100 | 100 - 400 | SETUP MAGNIFICATION x 4 | ↑ | NONE |
| 5 | 100 | 50 - 99 | SETUP MAGNIFICATION x 2 | ↑ | 2 |
| 6 | 400 | 50 - 400 | SETUP MAGNIFICATION | ↑ | NONE |
| 7 | 200 | 100 - 400 | SETUP MAGNIFICATION x 2 | ↑ | NONE |
| 8 | 200 | 50 - 99 | SETUP MAGNIFICATION | ↑ | 2 |
| 9 | 100 | 200 - 400 | SETUP MAGNIFICATION x 4 | ↑ | NONE |
| 10 | 100 | 100 - 199 | SETUP MAGNIFICATION x 2 | ↑ | 2 |
| 11 | 100 | 50 - 99 | SETUP MAGNIFICATION | ↑ | 4 |

IMAGE READER

BACKGROUND OF THE INVENTION

This invention relates to an image reader using photoelectric conversion elements for reading an original image and in particular to an image reader that can vary resolution.

An image reader is realized, for example, as an input part of a copier or a facsimile machine or as an image scanner connected to a computer or a network. The image reader has various read modes, one of which can be selected by the user. The available read modes include resolution selection, magnification setting, etc.

A method of changing resolution in the vertical scanning direction by changing the transport speed of an original and the number of thinned-out lines in combination is known, for example, as disclosed in the Unexamined Japanese Patent Application Publication No. Hei 4-369163, as a resolution changing method in a conventional image reader. Generally, a method of thinning out pixels is used to change resolution in the horizontal scanning direction. However, such techniques for changing resolution cannot meet recent demands for speeding up and high resolution of image readers; a technology satisfying such demands is in need of development.

FIG. 9 is an illustration to show an example of the relationship between resolution and setup magnification and vertical scanning speed and interpolation lines in a conventional image reader. In this example, the resolution can be selected from among three levels of 400 spi, 200 spi, and 100 spi and the magnification can be set in the range of 50% to 400%. The vertical scanning speed is the original transport speed or the photoelectric conversion element move speed.

For example, mode 2 means that the resolution is 400 spi and that the vertical scanning speed is changed in response to the setup magnification 50%–400%. That is, as the setup magnification is nearer to 50%, the vertical scanning speed is increased and the number of samplings is decreased, reducing an image. As the setup magnification is nearer to 400%, the vertical scanning speed is slowed down and the number of samplings is increased, enlarging an image.

If the resolution is set to a half of the resolution 400 spi, namely, to 200 spi, the vertical scanning speed is set to twice the speed responsive to the setup magnification and the number of samplings in the vertical scanning direction is halved for lowering the resolution, as shown in mode 3. However, there is also a limit of speeding up the vertical scanning speed; in the example, the limit is reached when the setup magnification 100% with the resolution 100 spi is selected. As shown in mode 5, if the setup magnification is smaller than 100% with 100 spi, instead of multiplying the vertical scanning speed by four, the vertical scanning speed is doubled and two lines are interpolated or one line is thinned out for decreasing the number of lines.

In the example, in mode 2 to mode 5, photoelectric conversion elements are moved for executing vertical scanning and in mode 6 to mode 11, an original is moved for executing vertical scanning. Generally, a motor of an ADF (automatic document feeder), etc., used to transport an original has a low capability and the original transport speed is slow. Thus, the vertical scanning speed limit is low in modes 6 to 11 for moving an original as compared with modes 2 to 5 for moving the photoelectric conversion elements, so that changing resolution in the vertical scanning direction interpolation processing when a low magnification with a low resolution is selected.

In such a conventional image reader, the vertical scanning speed is changed and the lines are thinned out or interpolated for decreasing the number of lines in response to the selected resolution and setup magnification, as shown in FIG. 9. However, if the lines are thinned out, the image quality is degraded sharply and if the lines are interpolated, the image of one or more lines previously read must be stored in a memory, for example. The interpolation memory is a factor of increasing image reader costs. To improve the image quality, it is also desirable to deal with change of resolution and magnification by sampling without performing such thinning out or interpolating processing.

On the other hand, as art related to the invention, both a mode of changing the accumulation time of a solid state image sensing device in a television camera for lessening a blur when a mobile image is picked up and a mode of lessening the flicker effect produced by a fluorescent lamp, etc., are realized, for example, in the Unexamined Japanese Patent Application Publication No. Hei 7-36616. If the accumulation time of a solid state image sensing device is changed, the signal level output from the solid state image sensing device changes. In the document, a lens aperture and an analog amplification circuit gain are made variable, whereby the signal level is made constant. However, in such signal processing, when the signal gain is changed, the offset value of the analog amplification circuit also changes, thus the black level of the signal changes and the density changes before and after the accumulation time is changed. In the document, changing of the accumulation time and changing of any other signal level in response to resolution change is not mentioned at all. Further, in the image reader, an original is lighted by an exposure lamp. At this time, change with time such as degradation of the exposure lamp also occurs and the signal gain, offset value, and the like set when the accumulation time is changed need to be found at a predetermined timing rather than set at the shipment time.

SUMMARY OF THE INVENTION

It is therefore an object of the invention to provide an image reader for reading an image in response to at least resolution setting and providing a high-quality image without thinning out lines or performing line interpolation processing.

According to the invention as claimed in claim 1, there is provided an image reader comprising image read means having an array of a large number of photoelectric conversion elements for converting an original image into electric signals, move means for relatively moving the original and the image read means, drive means for driving the photoelectric conversion elements of the image read means in accordance with setup accumulation time, and control means for setting move speed of the original and the image read means moved by the move means and the accumulation time at least in accordance with a resolution.

In the invention as claimed in claim 2, the image reader as claimed in claim 1 further includes gain control means for amplifying the electric signals output from the photoelectric conversion elements at a variable amplification level and offset control means for adjusting offset levels of the signals amplified by the gain control means, wherein the control means finds the amplification level of the gain control means and the offset levels of the offset control means to set the move speed and the accumulation time at least in accordance with a resolution.

In the invention as claimed in claim 3, the image reader as claimed in claim 1 further includes gain control means for amplifying the electric signals output from the photoelectric conversion elements at a variable amplification level, offset control means for adjusting offset levels of the signals amplified by the gain control means, and storage means for storing the amplification level and the offset levels, wherein the control means sets the move speed and the accumulation time and also selects the amplification level and the offset levels stored in the storage means and sets the amplification level and the offset levels in the gain control means and the offset control means respectively.

In the invention as claimed in claim 4, the image reader as claimed in claim 3, the amplification level and the offset levels stored in the storage means are found at least for each setup accumulation time at the power on time.

BRIEF DESCRIPTION OF THE DRAWINGS

In the accompanying drawings:

FIG. 3 is an illustration to show an example of the relationship between resolution and setup magnification and vertical scanning speed and interpolation lines in the embodiment of the image reader of the invention;

FIG. 9 is an illustration to show an example of the relationship between resolution and setup magnification and vertical scanning speed and interpolation lines in a conventional image reader.

DETAILED DESCRIPTION OF THE PREFERRED EMBODIMENTS

Figure 1:
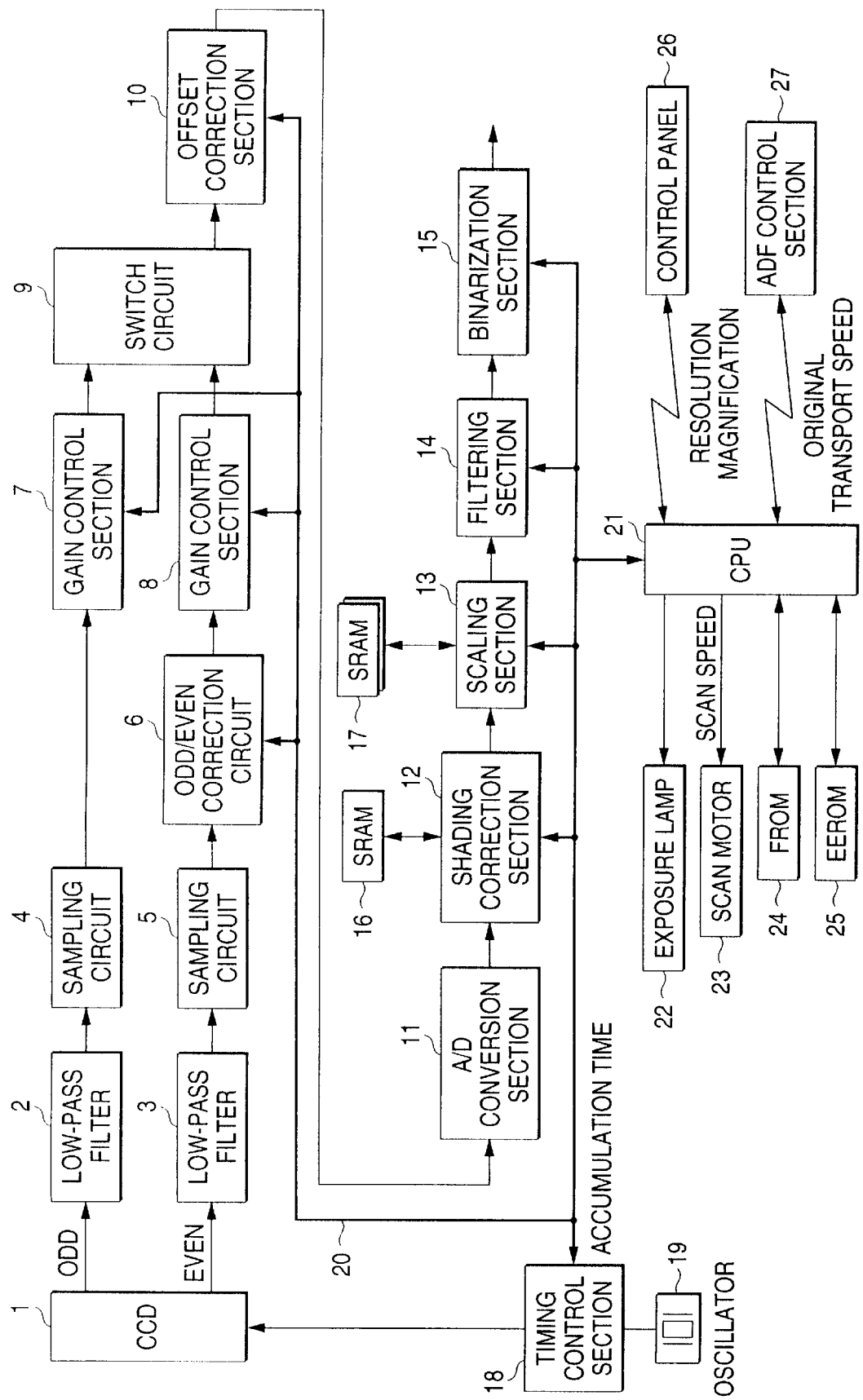
FIG. 1 is a main block diagram to show one embodiment of an image reader of the invention.
Figure 2:
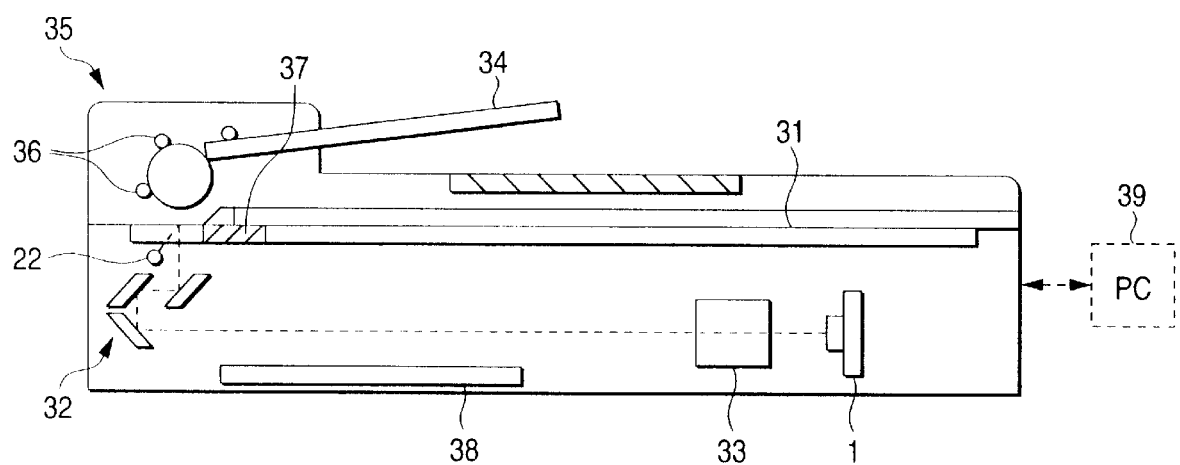
FIG. 2 is a sectional view to show the main structure in the embodiment of the image reader of the invention.

FIG. 1 is a main block diagram to show one embodiment of an image reader of the invention. FIG. 2 is a sectional view to show the main structure in the embodiment of the image reader of the invention. In the figures, numeral 1 is a CCD (charge-coupled device), numerals 2 and 3 are low-pass filters, numerals 4 and 5 are sampling circuits, numeral 6 is an odd/even correction section, numerals 7 and 8 are gain control sections, numeral 9 is a switch circuit, numeral 10 is an offset correction section, numeral 11 is an A/D converter, numeral 12 is a shading correction section, numeral 13 is a scaling section, numeral 14 is a filtering section, numeral 15 is a binarization section, numerals 16 and 17 are memories, numeral 18 is a timing control section, numeral 19 is an oscillator, numeral 20 is a bus, numeral 21 is a CPU (central processing unit), numeral 22 is an exposure lamp, numeral 23 is a scan motor, numeral 24 is an FROM (flash read-only memory), numeral 25 is an EEROM, numeral 26 is a control panel, numeral 27 is an ADF control section, numeral 31 is a platen, numeral 32 is a mirror group (mirrors), numeral 33 is a lens, numeral 34 is an original tray, numeral 35 is an ADF, numeral 36 is a transport roll, numeral 37 is a whiteboard, numeral 38 is a board, and numeral 39 is a host computer. Most parts shown in FIG. 1 are mounted on the board 38 in FIG. 2. The host computer 39 is connected appropriately as required.

In the embodiment, an original is placed on the platen 31 or the original tray 34. The original placed on the platen 31 is scanned in the vertical scanning direction as the exposure lamp 22 and the mirrors are moved. The original placed on the original tray 34 is taken in the image reader through the ADF and is transported by means of the transport roll 36. At this time, the original is read at the position of the exposure lamp 22 and the mirrors 32 shown in FIG. 2. The whiteboard 37 is provided for providing white used as reference when the parts shown in FIG. 1 are adjusted. The two read methods shown in FIG. 2 are shown as an example; in addition to either of the methods, various methods such as a method of transporting an original to the platen by the ADF, then moving the exposure lamp 22 and the mirrors 32 for scanning the original and a method of moving an original together with the platen in a piece can be adopted to configure an image formation system.

The exposure lamp 22 lights an original for forming the original image on the CCD 1 through the lens 33. The CCD 1, which is a so-called line sensor, has a large number of photoelectric conversion elements arranged in the horizontal scanning direction for converting incident optical signals into electric signals. The CCD 1 has two output ports; signals from the odd number'th photoelectric conversion elements are output to one port in sequence and the even number'th photoelectric conversion elements are output to the other in sequence.

The low-pass filters 2 and 3 remove unnecessary high-frequency components from electric signals output from the CCD 1. The sampling circuits 4 and 5 extract image signals from electric signals. The odd/even correction section 6 corrects the characteristic difference between the odd and even number'th signals output from the CCD 1. Particularly, it makes a correction to match the offset level difference between the odd and even number'th signals. The gain control sections 7 and 8 amplify electric signals until the electric signals are placed within the reference value range. The switch circuit 9 selects the odd and even number'th signals from the CCD 1 to sort the signals into a row of signals in the horizontal scanning direction. The offset correction section 10 corrects electric signal offset and particularly adjusts the black level. The A/D converter 11 converts an analog electric signal into digital data.

The shading correction section 12 corrects limb darkening caused by the exposure lamp 22, the lens 33, etc., for example, and the characteristic difference between the photoelectric conversion elements of the CCD 1. The scaling section 13 scales down or up an image in the horizontal scanning direction. The filtering section 14 performs digital filtering for applying various types of image processing, including ground removal processing, etc. The binarization section 15 converts multivalued digital data into binary data. At the time, for example, to represent halftone, the binarization section 15 binarizes the data by performing pseudo-halftone processing, such as a dither method, or the like or may binarize data in a text part, etc., by performing threshold processing. The data thus binarized is output to an output unit, a facsimile, the host computer 39, a network, etc.

The timing control section 18 counts clocks generated by the oscillator 19 and outputs a clock for driving the CCD 1 in accordance with the setup accumulation time, etc., and also supplies operation timing signals to the parts shown in FIGS. 1 and 2.

The CPU 21 operates in accordance with a program, etc., stored in the FROM 24 and controls the parts of the image reader. It sets a correction amount for the odd/even correction section 6, a gain for the gain control sections 7 and 8, and an offset value for the offset correction section 10. The CPU 21 also sets parameters required for the operation of the shading correction section 12, the scaling section 13, the filtering section 14, and the binarization section 15 and controls the operation thereof. Further, the CPU 21 sets the CCD 1 accumulation time for the timing control section 18. They are connected by the bus 20. The CPU 21 controls the exposure lamp 22 on/off, controls the operation of the scan motor and sets scan speed for the scan motor, and transmits original transport speed to the ADF control section 27. Further, it communicates with the control panel 26 for getting various setup values and making a request for outputting messages, machine state, etc., to the operator. The CPU 21 is also connected to various sensors, interfaces, etc., although they are not shown.

The exposure lamp 22 lights an original. The scan motor 23 moves the exposure lamp 22 and the mirrors 32 for scanning the original in the vertical scanning direction at the scan speed set by the CPU 21. The EEROM 25 holds the gain set in the gain control sections corresponding to the CCD 1 accumulation time, the offset value set in the offset correction section 10, and the like. The control panel 26 is an interface for the operator to set various parameters, etc., and for displaying the image reader state, messages, etc. At least a resolution, a magnification, etc., can be set on the control panel. Of course, they may be set from the host computer 39, etc. The ADF control section 27 controls the operation of the ADF 35 and the transport roll 36 disposed therein. The transport roll 36 is operated in accordance with the transport speed set by the CPU 21.

If the operator enters a resolution and a magnification through the control panel 26, the entered resolution and magnification are sent to the CPU 21, which then finds the CCD 1 accumulation time and speed in the vertical scanning direction from the resolution and magnification information and depending on the selected input method, namely, reading the original on the platen 31 or reading the original while the original is transported using the ADF 35. Then, the CPU 21 sets the found accumulation time in the timing control section 18. The timing control section 18 drives the CCD 1 in accordance with the setup accumulation time. To read the original on the platen 31 according to the selected input method, the speed in the vertical scanning direction is set for the scan motor 23 and the exposure lamp 22 and the mirrors 32 are moved at the setup scan speed for scanning the original in the vertical scanning direction. To use the ADF 35, the found speed in the vertical scanning direction is sent to the ADF control section 27, which then transports the original on the original tray 24 by means of the transport roll 36 at the setup speed.

FIG. 3 is an illustration to show an example of the relationship between resolution and setup magnification and vertical scanning speed and interpolation lines in the embodiment of the image reader of the invention. Here, a resolution of 600 spi is enabled and the setting with 600 spi is used as reference. For example, in FIG. 9, the accumulation time is constant and line interpolation is executed. In the invention, the accumulation time is changed in response to a resolution and setup magnification. The need for line interpolation processing is eliminated.

In the example shown in FIG. 3, when the highest resolution 600 spi is set, the CCD 1 accumulation time is the minimum. This accumulation time is set to the minimum accumulation time T and one is selected from among five types of T, 1.5T, 2T, 3T, and 6T and is loaded into the timing control section 18.

In modes 1 to 5, the read method of placing an original on the platen 31 and moving the exposure lamp 22 and the mirrors 32 for vertically scanning the original is used. In this case, the resolution 600 spi is realized as shown in mode 1. The accumulation time applied at this time is T and the vertical scanning speed is set to the speed responsive to the setup magnification. For example, with the vertical scanning speed, when the setup magnification is 100%, as the reference, when the setup magnification is 200%, the vertical scanning speed is set to one half the speed; when 400%, one quarter the speed, and when 50%, twice the speed.

In mode 2, the resolution is 400 spi, two-thirds of 600 spi, thus the accumulation time is set to 1.5T and the vertical scanning speed is set to the speed responsive to the setup magnification as in mode 1. In modes 3 and 4 with resolutions 200 spi and 100 spi respectively, the accumulation time is set to 1.5T and the vertical scanning speed is set to twice and four times the speed responsive to the setup magnification respectively.

In mode 5, the resolution is 100 spi and the magnification is smaller than 100%, thus vertical scanning speed higher than that in mode 4 is required. For example, if the vertical scanning speed when the resolution is 400 spi and the setup magnification is 100% is used as the reference, eight times the speed is required when the resolution is 100 spi and the setup magnification is 50%. However, since it is necessary to upsize the scan motor 23, etc., speeding up of four times or more the vertical scanning speed is not adopted. As shown in FIG. 9, interpolation processing was executed formerly; in the invention, the accumulation time is prolonged. In the example, the accumulation time is set to 3T and the vertical scanning speed is set to twice the speed responsive to the setup magnification, whereby the vertical scanning speed when the resolution is 100 spi and the setup magnification is 50% becomes four times that when the resolution is 400 spi and the setup magnification is 100%. In the mode, interpolation processing is not performed.

In modes 6 to 11, the ADF 35 is used. In most cases, the ADF 35 is attached to a movable cover and it is desired that the ADF 35 is compact and lightweight. Thus, the motor for driving the drive roll 36 of the ADF 35 has weak power as compared with the motor for driving the exposure lamp 22 and the mirrors 32 attached to the main body and cannot transport an original at high speed. Here, the motor of the ADF 35 can transport an original only at up to twice the speed used as the reference when the resolution is 400 spi and the setup magnification is 100%.

In mode 6 with the resolution 400 spi, an original can be read in setting similar to that in mode 2. When the resolution is 200 spi, similar setting to that in mode 3 may be used in mode 7 with the setup magnification 100% or more. However, when the setup magnification is less than 100%, the original transport speed becomes too fast, thus the CCD 1 accumulation time is set to 3T and the vertical scanning speed is set to the speed responsive to the setup magnification, whereby the original transport speed becomes twice the speed used as the reference when the resolution is 400 spi and the setup magnification is 100% even when the resolution is 200 spi and the magnification is 50%.

If the resolution is 100 spi, in mode 9 with the setup magnification 200% or more, an original can be read in setting similar to that in mode 4. However, if the setup magnification is 100%–199%, the original transport speed becomes too fast at speed of four times the setup magnification, thus the accumulation time is set to 3T and the vertical scanning speed is set to twice the speed responsive to the setup magnification as in mode 5 described above. Further, when the setup magnification is less than 100%, the accumulation time is set to 6T and the vertical scanning speed is set to the speed responsive to the setup magnification.

Modes 12 to 14 are used to output an read image to the host computer 39. Generally, the transfer rate to the host computer 39 and the storage speed in the memory are slower than the read speed of the image formation system. Thus, for example, with the resolution 600 spi in mode 12, the vertical scanning speed is set to one third the speed responsive to the setup magnification and the accumulation time is set to 3T for taking the time three times that in mode 1 for reading an original. When the resolution is 400 spi or 300 spi, the host computer can input at the normal read speed; the vertical scanning speed is set to the speed responsive to the setup magnification and the accumulation time is changed to 1.5T or 2T respectively.

The vertical scanning speed and the accumulation time are thus set in response to the resolution and setup magnification, whereby images can be read in response to various resolutions, setup magnifications, read methods, and output methods. At this time, interpolation processing as formerly executed is not performed, thus eliminating the need for a memory for storing image data of one to several lines already read. Since interpolation processing is not performed in the vertical scanning direction, images of good quality can be provided independently of various resolutions or magnifications.

If the CCD 1 accumulation time is thus changed in accordance with resolution and magnification, the magnitude of electric signals output from the CCD 1 changes. That is, the photoelectric conversion elements of the CCD 1 generate and output electric signals responsive to the quantity of light applied within the accumulation time. Even if the same amount of light is always applied, electric signals responsive to the length of the accumulation time are generated. However, if the same original is input, equal image data must be output regardless of how long the accumulation time is. Thus, it is necessary to change the gain set in the gain control sections 7 and 8 and the offset value set in the offset correction section 10 in response to the accumulation time.

For example, as the accumulation time shortens, the magnitude of signals output from the CCD 1 lessens. Thus, the gain in the gain control sections 7 and 8 is increased for amplifying the signals. Since the signal output in a no-light state is also amplified at the same time, the offset correction section 10 may correct the offset so as to lower it. If the accumulation time is prolonged, a correction may be made so as to lessen the gain and raise the offset.

Such gains and offset values responsive to the accumulation time can be previously measured and stored in ROM, etc., for example. However, CCD 1 output gradually changes due to change of the exposure lamp 22 with time, etc., and if the values are determined, for example, at the shipment time, proper signal processing may become gradually impossible. Thus, for example, whenever power of the image reader is turned on, the values are measured and signal processing can be performed in response to the image reader characteristics at the time.

In the configuration example described above, the gain and offset values responsive to the accumulation time are stored in the EEPROM 25 and when resolution and magnification are set on the control panel 26, the gain and offset value responsive to the setup resolution and magnification are read from the EEROM 25 and are loaded into the gain control sections 7 and 8 and the offset correction section 10. In the example, the correction amount of the odd/even correction section 6 is also set in response to the accumulation time.

Figure 4:
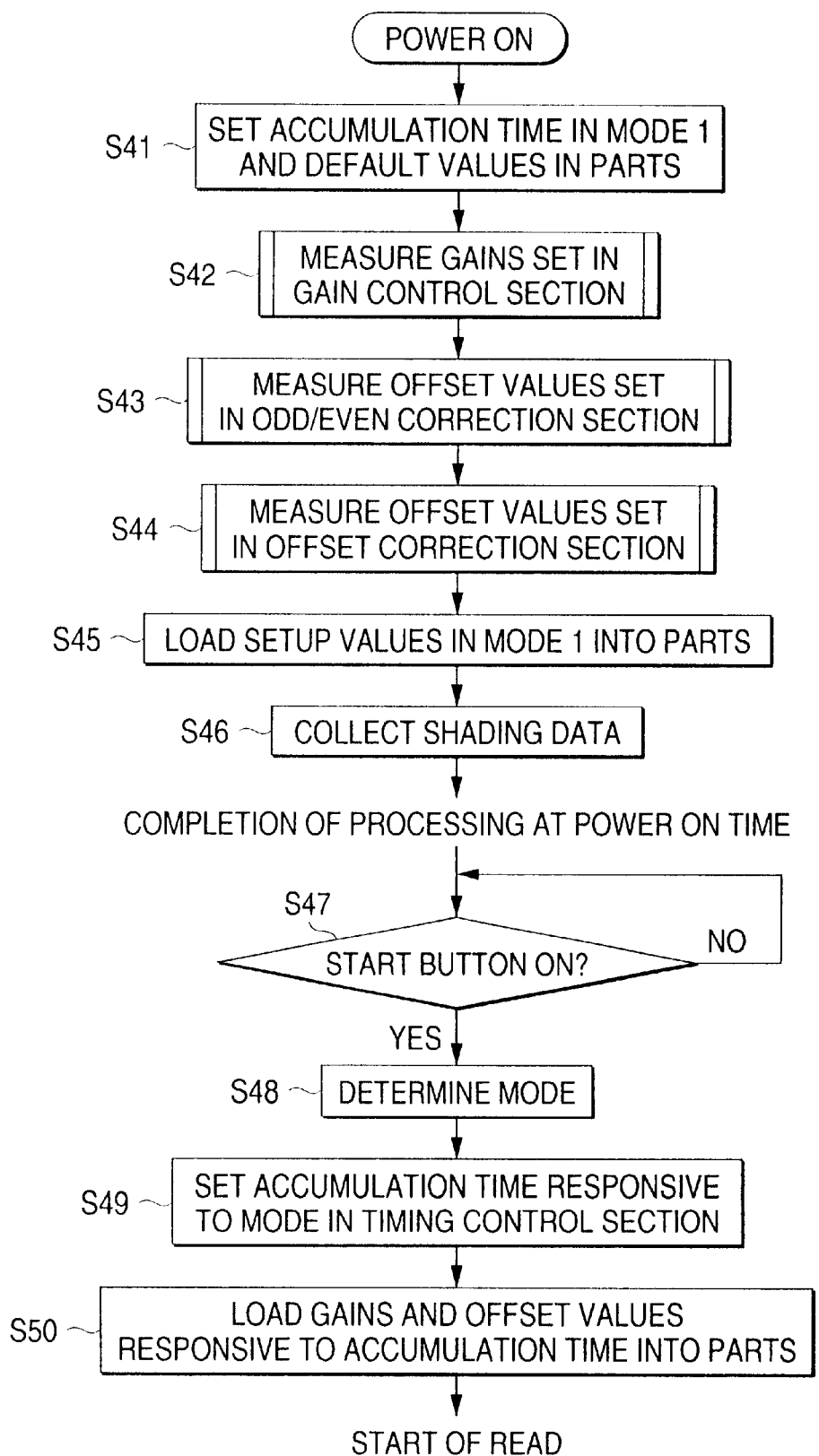
FIG. 4 is a flowchart to show an example of the whole operation in the embodiment of the image reader of the invention.

FIG. 4 is a flowchart to show an example of the whole operation in the embodiment of the image reader of the invention. When the power of the image reader is turned on, first at step S41, the accumulation time in mode 1 shown in FIG. 3 is set as the default accumulation time and default values are set in the parts shown in FIG. 1.

At step S42, gains set in the gain control sections 7 and 8 in response to each accumulation time are measured. At step S43, the offset values set in the odd/even correction section 6 in response to each accumulation time are measured. Further, at step S44, the offset values set in the offset correction section 10 in response to each accumulation time are measured. The measurement values are stored in the EEROM 25. Upon completion of the measurement, at step S45, the setup values in mode 1 (default mode) are loaded into the parts. Next, at step S46, shading data is collected and stored in the memory 16. Processing at the power on time is now complete.

At step S47, control waits until a start button is pressed. When the start button is pressed, control goes to step S48 at which the mode set, for example, on the control panel 26, etc., is determined. The setup mode contains a resolution, a setup magnification, etc. A read method may be set. It may be set by detecting the position at which an original is set by a sensor, etc. At step S49, the CCD 1 accumulation time responsive to the setup mode is gotten and set in the timing control section 18. At step S50, the gain and offset values responsive to the setup mode are read from the EEROM 25 and are loaded into the gain control sections 7 and 8, the odd/even correction section 6, the offset correction section 10, etc.

Reading the original image is started. If the original is placed on the platen 31, the exposure lamp 22 and the mirrors 32 are moved by the scan motor 23 at the vertical scanning speed responsive to the setup resolution and magnification for reading the original. The CCD 1 is driven by the timing control section 18 in response to the setup accumulation time. The photoelectric conversion elements of the CCD 1 convert the received light quantity within the accumulation time into electric signals and output the electric signals. At this time, the odd number'th photoelectric conversion elements output the electric signals to the low-pass filter 2 and the even number'th photoelectric conversion elements output the electric signals to the low-pass filter 3 in sequence.

Unnecessary high-frequency components of the electric signals output from the CCD 1 are removed through the low-pass filters 2 and 3 and image signals are extracted by the sampling circuits 4 and 5. Offset of the image signals sampled by the sampling circuit 5 is corrected by the odd/even correction section 6 so as to become offset equivalent to that of the image signals sampled by the sampling circuit 4. The image signals sampled by the sampling circuit 4 and the image signals corrected by the odd/even correction section 6 are amplified by the gain control sections 7 and 8 respectively according to the gain set therein. Outputs of the gain control sections 7 and 8 are selected by the switch circuit 9 alternately to form a row of image signals and an offset correction is made to the image signal row by the offset correction section 10 according to the offset value set therein for adjusting the black level.

The analog image signals thus adjusted are converted into digital data by the A/D converter 11 and a shading correction is made to the digital data by the shading correction section 12. Reading the original in accordance with the vertical scanning speed and the accumulation time as shown in FIG. 3 results in the number of lines responsive to the setup resolution and magnification in the vertical scanning direction, but the CCD 1 resolution remains intact in the horizontal scanning direction. Thus, the image is scaled down or up in the horizontal scanning direction by the scaling section 13. After this, the filtering section 14 performs image processing such as digital filtering, then the binarization section 15 converts the multivalued digital data into binary data and outputs the binary data.

Figure 5:
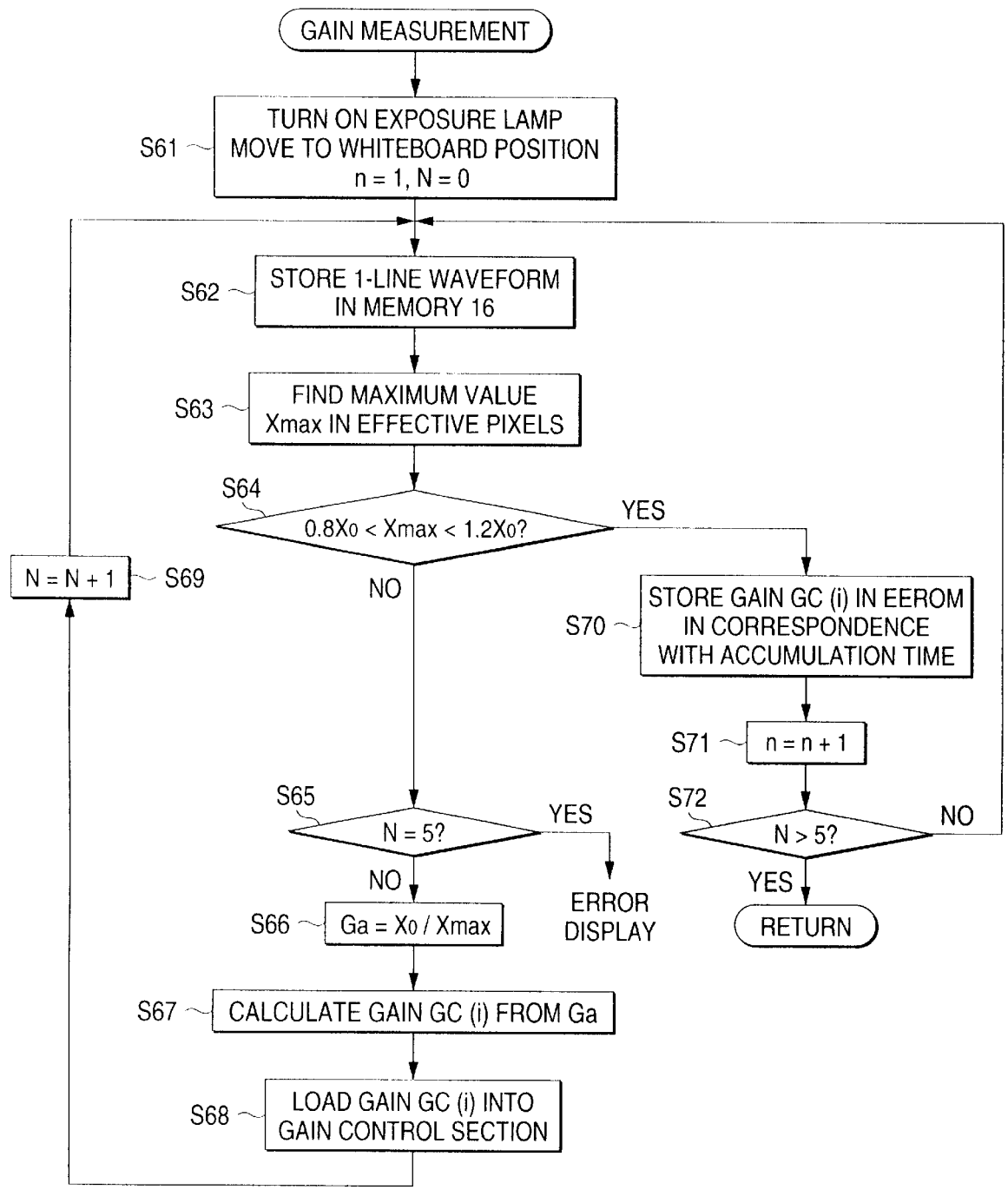
FIG. 5 is a flowchart to show an example of the gain setting operation in the embodiment of the image reader of the invention.

FIG. 5 is a flowchart to show an example of the gain setting operation in the embodiment of the image reader of the invention. Here, the gain measurement operation performed at step S42 in FIG. 4 will be discussed. First at step S61, the exposure lamp 22 is turned on and the read position is moved to the position of the whiteboard 37 shown in FIG. 2. The whiteboard 37 is used as the white reference and is disposed outside the original read area. Further, variable n indicating the accumulation time type, namely, any of the five accumulation types T, 1.5T, 2T, 3T, and 6T is set to 1 and variable N indicating the number of retries is set to 0.

At step S62, a 1-line image is read and its waveform is stored in the memory 16. That is, white image is read with the whiteboard 37 as the reference. At step S63, maximum value Xmax in pixels is found. At step S64, whether or not the maximum value Xmax found at step S63 is within a predetermined range is determined. Here, as an example, when the maximum value Xmax is within the range of 0.8 Xo to 1.2 Xo with the target value set to Xo, it is determined that the gain to be set is obtained. If the maximum value Xmax is beyond the range, control goes to step S65 at which whether or not the number of retries reaches a predetermined number of retries is determined. Here, if the maximum signal value does not lie within the predetermined range although N reaches five, an error message is displayed.

To make a retry, at step S66, the ratio between the maximum value Xmax and the target value Xo, namely, $$Ga = Xo/Xmax$$

is found and at step S67, gain GC (i) is corrected based on Ga found at step S66. For example, G (i) can be found as $$GC(i) = GC(i) + (20 \log Ga) + 0.092$$

Of course, this correction expression is given as an example and the gain can be corrected in an arbitrary manner. At step S68, the gain GC (i) found at step S67 is loaded into the gain control sections 7 and 8. At step S69, the number of retries, N, is incremented by one and control returns to step S62 at which image read is retried.

If the maximum value Xmax of the read image is within the predetermined range at step S64, it is assumed that the current gain set in the gain control sections 7 and 8 is correct, and control goes to step S70 at which the setup gain GC (i) is stored in the EEROM 25 in correspondence with the accumulation time. To measure the gain with respect to the next accumulation time, at step S71, the variable n indicating the accumulation time type is incremented by one and at step S72, whether or not gain measurement is complete with respect to all the five accumulation time types is determined. If gain measurement with respect to any accumulation time type is not yet complete, control returns to step S62 and gain measurement with respect to another accumulation time is continued. If gains are obtained with respect to all the five accumulation time types, the gain setting processing is terminated.

Figure 6:
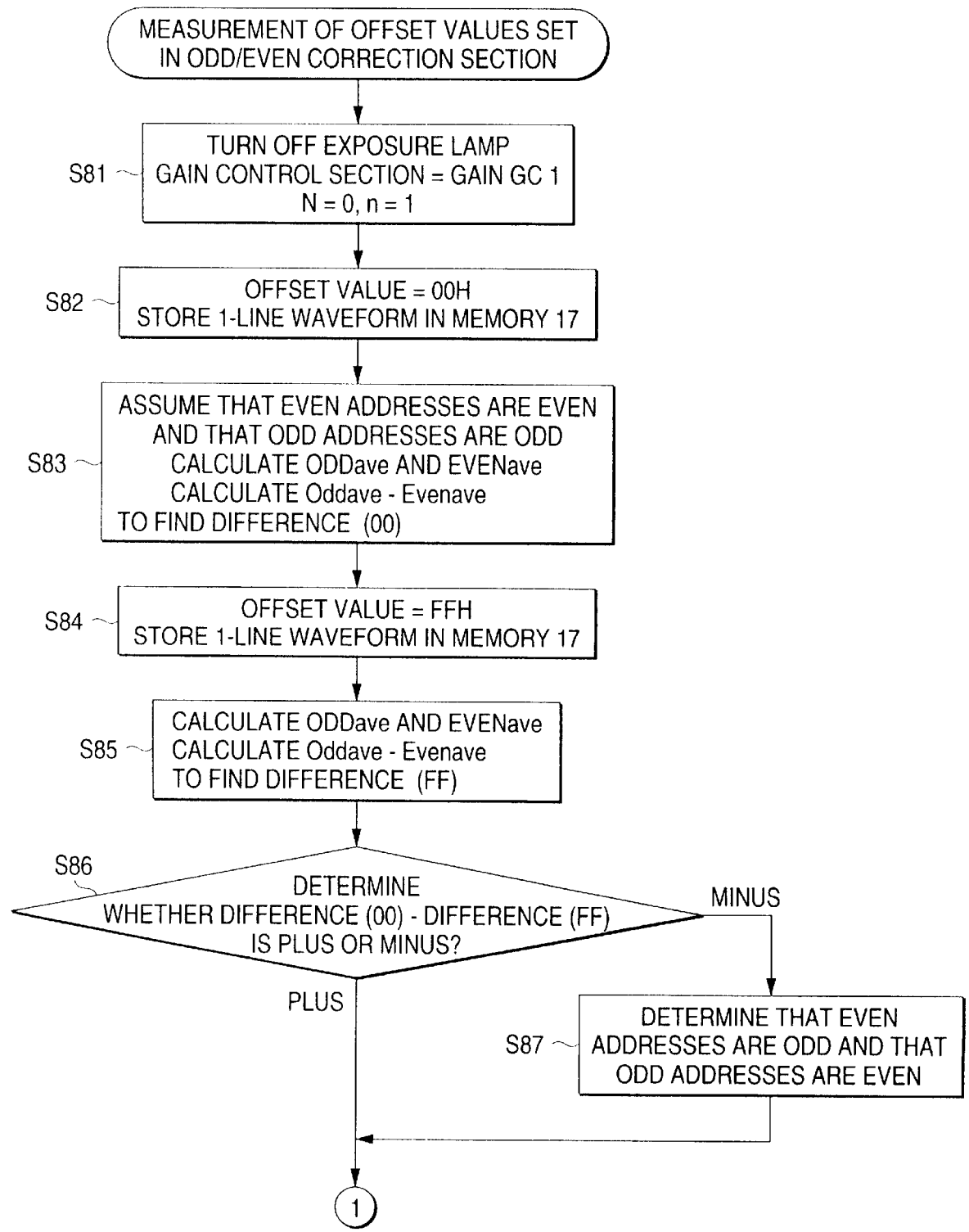
FIG. 6 is a flowchart to show an example of the measurement operation of offset values set in an odd/even correction section in the embodiment of the image reader of the invention.
Figure 7:
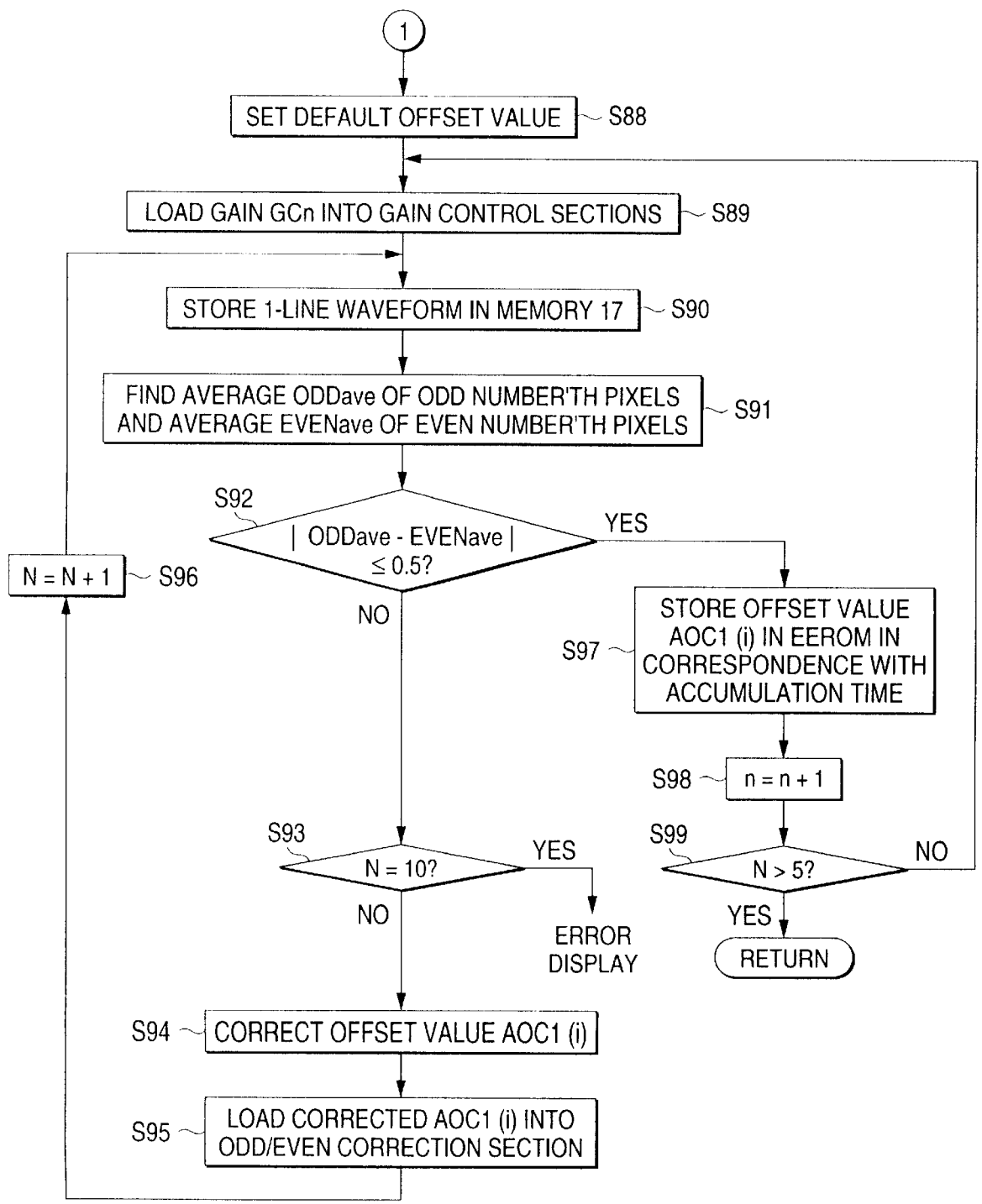
FIG. 7 is a flowchart (continued) to show an example of the measurement operation of offset values set in the odd/even correction section in the embodiment of the image reader of the invention.

FIGS. 6 and 7 are flowcharts to show an example of the measurement operation of offset values set in the odd/even correction section in the embodiment of the image reader of the invention. Here, the measurement operation of offset values set in the odd/even correction section 6 in response to each accumulation time, performed at step S43 in FIG. 4 will be discussed. At step S81, the exposure lamp 22 is turned off and the gain measured at step S42 is loaded into the gain control sections 7 and 8. The variable n indicating the accumulation time type is initialized to 1 and the gain corresponding to the accumulation time is loaded. The variable N indicating the number of retries is set to 0.

At step S82, an offset value of 0 is set in the odd/even correction section 6 and a 1-line waveform is read and is stored in the memory 17. At this time, it is stored in the memory 17 rather than the memory 16 so that the shading correction section 12 does not malfunction. At step S83, it is assumed that the pixels of the image data stored at even addresses of the memory 17 are those output from the even number'th photoelectric conversion elements of the CCD 1 and that the pixels stored at odd addresses are those output from the odd number'th photoelectric conversion elements of the CCD 1. Whether or not this assumption is correct is determined at step S86. At step S83, average ODDave of the values at the odd address and average EVENave of the values at the even address are calculated and the difference therebetween $$(00) = ODDave - EVENave$$

is found.

At step S84, the greatest value FF (hexadecimal) is set in the odd/even correction section 6 as an offset value and a 1-line waveform is read and is stored in the memory 17. At step S85, the average ODDave of the values stored at the odd address of the memory 17 and the average EVENave of the values stored at the even address are calculated and the difference therebetween $$(FF) = ODDave - EVENave$$

is found.

At step S86, the result of difference (00)—difference (FF) is tested. If the assumption at step S83 is correct, the EVENave value calculated at step S85 becomes greater, thus the difference (FF) becomes a minus value and difference (00)—difference (FF) results in a plus value. In contrast, if the assumption at step S83 is incorrect, the ODDave value calculated at step S85 becomes greater and the difference (FF) becomes a greater plus value, thus difference (00)—difference (FF) results in a minus value. Therefore, if difference (00)—difference (FF) results in a minus value, it is determined that the assumption at step S83 is incorrect, and control goes to step S87 at which it is determined that the pixels of the image data stored at the even addresses of the memory 17 are those output from the odd number'th photoelectric conversion elements of the CCD 1 and that the pixels stored at the odd addresses are those output from the even number'th photoelectric conversion elements of the CCD 1. If difference (00)—difference (FF) results in a plus value, it is determined that the assumption at step S83 is correct, and control goes to the following step:

At step S88, a default offset value is set in the odd/even correction section 6. At step S89, the gain GC (n) corresponding to the variable n indicating the accumulation time type is loaded into the gain control sections 7 and 8. In such setting, at step S90, a 1-line waveform is stored in the memory 17 and average ODDave of the odd number'th pixels and average EVENave of the even number'th pixels are found. At step S92, the difference between ODDave and EVENave is found and whether or not the difference is within a predetermined range is determined. Here, whether or not the absolute value of the difference is equal to or less than 0.5 is determined. This threshold value can be set to any value.

If it is determined at step S92 that the difference is outside the predetermined range, it means that the current offset value set in the odd/even correction section 6 is not proper. Then, the offset value is corrected. First, at step S93, if the value of the variable N indicating the number of retries reaches 10, it is determined that if the offset value is corrected, a proper value does not result. The retry is terminated and an error message is displayed. If the value of the variable N is less than 10, control goes to step S94 at which the current setup offset value AOC1 (i) is corrected using the ODDave and EVENave values found at step S91. For example, AOC1 (i) can be found as $$AOC1(i)=85.4(ODDave-EVENave)+AOC1(i)$$

Of course, this correction expression is given as an example and the offset value can be corrected in an arbitrary manner. At step S95, the offset value AOC1 (i) corrected at step S94 is loaded into the odd/even correction section 6. At step S96, the number of retries N is incremented by one and control returns to step S90 at which image read is retried.

If the absolute value of ODDave-EVENave is equal to or less than the predetermined value (in this case, 0.5) at step S92, it is determined that the current offset value set in the odd/even correction section 6 is correct, and control goes to step S97 at which the setup offset value AOC1 (i) is stored in the EEROM 25 in correspondence with the accumulation time. To measure the offset value with respect to the next accumulation time, at step S98, the variable n indicating the accumulation time type is incremented by one and at step S99, whether or not offset value measurement is complete with respect to all the five accumulation time types is determined. If offset value measurement with respect to any accumulation time type is not yet complete, control returns to step S89 and offset value measurement with respect to another accumulation time is continued. If offset values are obtained with respect to all the five accumulation time types, the offset value measurement processing is terminated.

Figure 8:
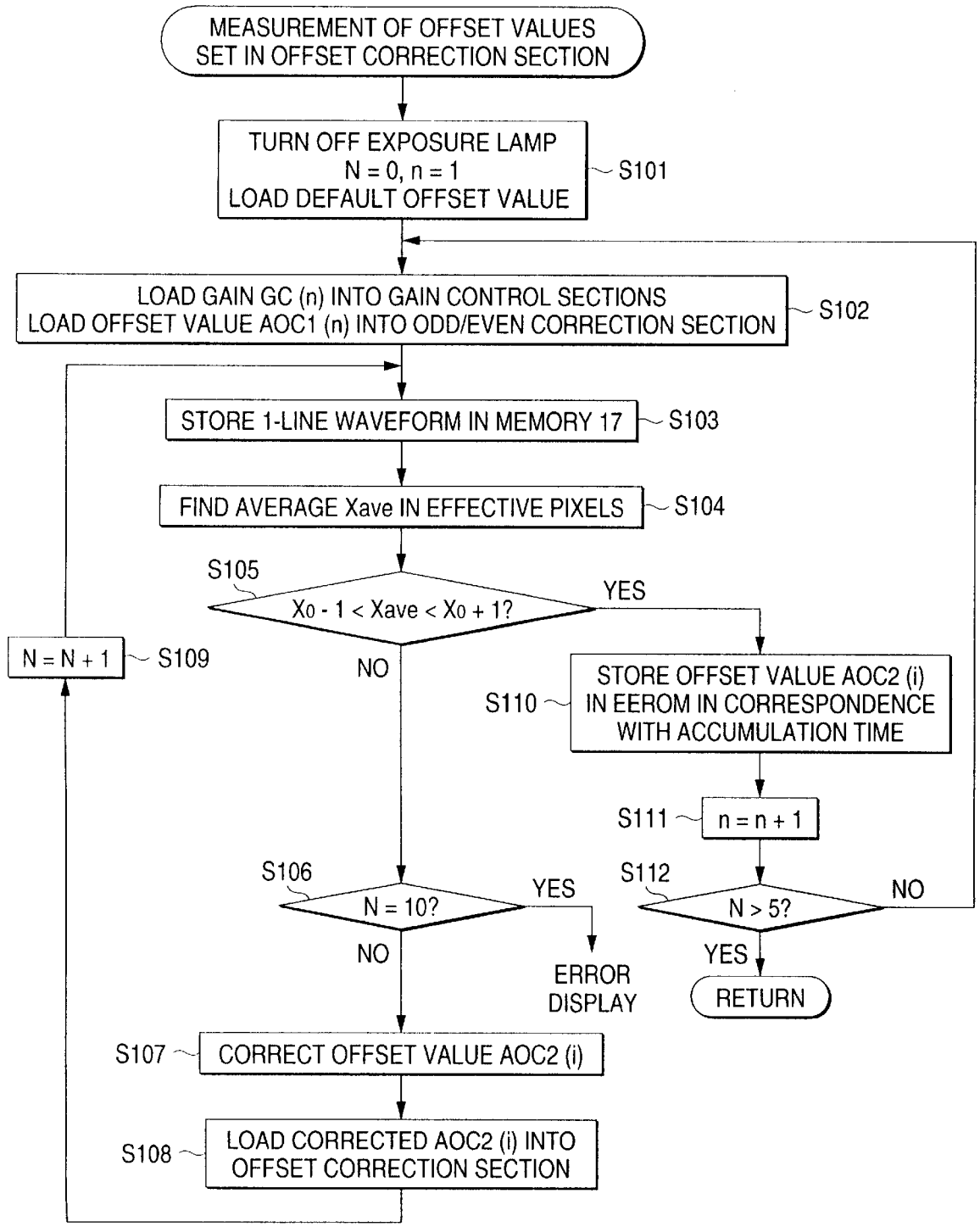
FIG. 8 is a flowchart to show an example of the measurement operation of offset values set in an offset correction section in the embodiment of the image reader of the invention.

FIG. 8 is a flowchart to show an example of the measurement operation of offset values set in the offset correction section in the embodiment of the image reader of the invention. Here, the measurement operation of offset values set in the offset correction section 10 in response to each accumulation time, performed at step S44 in FIG. 4 will be discussed. At step S101, the exposure lamp 22 is turned off and a default offset value is set in the offset correction section 10. The variable n indicating the accumulation time type is initialized to 1 and the variable N indicating the number of retries is set to 0.

At step S102, the gain GC (n) corresponding to the variable n indicating the accumulation time type is loaded into the gain control sections 7 and 8 and the offset value AOC1 (n) corresponding to the variable n is loaded into the odd/even correction section 6. In such setting, at step S103, a 1-line waveform is stored in the memory 17. At step S104, average Xave of effective pixels is found. At step S105, whether or not the average Xave found at step S104 is within a predetermined range is determined. Here, whether or not the average Xave is within the range of offset value target value Xo ±1 is determined. This threshold value can be set to any value.

If it is determined at step S105 that the average Xave is outside the predetermined range, it means that the current offset value set in the offset correction section 10 is not proper. Then, the offset value is corrected. First, at step S106, if the value of the variable N indicating the number of retries reaches 10, it is determined that if the offset value is corrected, a proper value does not result. The retry is terminated and an error message is displayed. If the value of the variable N is less than 10, control goes to step S107 at which the current setup offset value AOC2 (i) is corrected using the average Xave found at step S104 and the target value Xo. For example, AOC2 (i) can be found as $$AOC2(i)=10.1(Xave-Xo)+AOC2(i)$$

Of course, this correction expression is given as an example and the offset value can be corrected in an arbitrary manner. At step S108, the offset value AOC2 (i) corrected at step S107 is loaded into the offset correction section 10. At step S109, the number of retries N is incremented by one and control returns to step S103 at which image read is retried.

If the average Xave is within the predetermined range at step S105, it is determined that the current offset value set in the offset correction section 10 is correct, and control goes to step S110 at which the setup offset value AOC2 (i) is stored in the EEROM 25 in correspondence with the accumulation time. To measure the offset value with respect to the next accumulation time, at step S111, the variable n indicating the accumulation time type is incremented by one and at step S112, whether or not offset value measurement is complete with respect to all the five accumulation time types is determined. If offset value measurement with respect to any accumulation time type is not yet complete, control returns to step S102 and offset value measurement with respect to another accumulation time is continued. If offset values are obtained with respect to all the five accumulation time types, the offset value measurement processing is terminated.

The gains set in the gain control sections 7 and 8 and the offset values set in the odd/even correction section 6 and the offset control section 10 thus found at the steps shown in FIGS. 5 to 8 are stored in the EEROM 25 in correspondence with the accumulation times. As shown in FIG. 4, when an image is actually read, the accumulation time is set in response to the setup resolution and magnification and the gain and offset values corresponding to the setup accumulation time are loaded into the gain control sections 7 and 8, the odd/even correction section 6, and the offset control section 10. If the accumulation time together with the vertical scanning speed is changed in response to the resolution and setup magnification as described above, the electric signals output from the CCD 1 change, but the gain and offset values are thus changed, good output can be provided from the image reader independently of the accumulation time.

In the example shown in FIG. 4, the gain and offset values responsive to the CCD 1 accumulation time are found at the power on time and are stored in the EEROM 25. Thus, when the image read mode is selected, the gain and offset values are loaded into the gain control sections 7 and 8, the odd/even correction section 6, and the offset control section 10 in conformance with the mode, so that the image read start time is not delayed.

However, the invention is not limited to it; for example, whenever the resolution or setup magnification is changed, the gain and offset values may be found and set in response to the accumulation time determined from new setup resolution or magnification. Resolution or setup magnification change can be detected at various timings in such a manner that when the start button is pressed, the current setup values are compared with the immediately preceding setup values or that an instruction is given to the CPU after the expiration of a predetermined time since setting change on the control panel 26. In the configuration in which the gain and offset values are found when the resolution or setup magnification is changed, the need for the EEROM 25 for storing the value sets may be eliminated. Further, if the resolution or setup magnification is not changed, the gain and offset values may be set each time an image read batch is started, in which case change of the exposure lamp or the CCD with time can also be handled.

As seen from the description made so far, according to the invention, the resolution is changed by changing the vertical scanning speed and the accumulation time of the photoelectric conversion elements in combination. Thus, lines need not be thinned out, the need for a memory for storing read lines is eliminated, and good images free of quality degradation can be provided. Since a combination of the vertical scanning time and accumulation time can be selected in response to the characteristics of the mechanism of the drive system, etc., the image reader can cover a wide range of resolutions and magnifications; for example, it can provide the fastest read speed with the selected resolution.

The gain and offset values are changed for each setup photoelectric conversion element accumulation time, whereby read images free of quality change can be provided although the accumulation time varies. Particularly, the offset values are changed in response to the accumulation time, so that the effect of eliminating black level change can be produced.

What is claimed is:

1. An image reader comprising:

image read means having an array of a large number of photoelectric conversion elements for converting an original image into electric signals, move means for relatively moving the original and said image read means, drive means for driving the photoelectric conversion elements of said image read means in accordance with setup accumulation time, and control means for setting move speed of the original and said image read means moved by said move means and the accumulation time at least in accordance with a resolution.

2. The image reader of claim 1, further comprising:

gain control means for amplifying the electric signals output from the photoelectric conversion elements at a variable amplification level, and offset control means for adjusting offset levels of the signals amplified by said gain control means, wherein said control means finds the amplification level of said gain control means and the offset levels of said offset control means to set the move speed and the accumulation time at least in accordance with a resolution.

3. The image reader of claim 1, further comprising:

gain control means for amplifying the electric signals output from the photoelectric conversion elements at a variable amplification level, offset control means for adjusting offset levels of the signals amplified by said gain control means, and storage means for storing the amplification level and the offset levels, wherein said control means sets the move speed and the accumulation time and also selects the amplification level and the offset levels stored in said storage means and sets the amplification level and the offset levels in said gain control means and said offset control means respectively.

4. The image reader of claim 3, wherein the amplification level and the offset levels stored in said storage means are found at least for each setup accumulation time at power on time.

* * * * *